(12) United States Patent
Hilbert et al.

(10) Patent No.: US 12,140,229 B2
(45) Date of Patent: *Nov. 12, 2024

(54) NON-CONTACT SEAL ASSEMBLY WITH MULTIPLE SPACED SPRING ELEMENTS

(71) Applicant: RTX Corporation, Farmington, CT (US)

(72) Inventors: Brian F. Hilbert, Coventry, CT (US); Eric A. Grover, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/838,721

(22) Filed: Jun. 13, 2022

(65) Prior Publication Data

US 2022/0316598 A1     Oct. 6, 2022

Related U.S. Application Data

(63) Continuation of application No. 16/919,444, filed on Jul. 2, 2020, now Pat. No. 11,359,726.

(51) Int. Cl.
*F16J 15/44* (2006.01)
*F01D 11/02* (2006.01)

(52) U.S. Cl.
CPC .......... *F16J 15/442* (2013.01); *F01D 11/025* (2013.01); *F16J 15/445* (2013.01)

(58) Field of Classification Search
CPC .... F05D 2240/55; F16J 15/445; F16J 15/442; F01D 11/025
See application file for complete search history.

(56) References Cited

U.S. PATENT DOCUMENTS

| 4,998,739 A | 3/1991 | Weiler |
|---|---|---|
| 6,226,975 B1 | 5/2001 | Ingistov |

(Continued)

FOREIGN PATENT DOCUMENTS

| CA | 2536362 C | 2/2013 |
|---|---|---|
| WO | 2008094761 A1 | 8/2008 |

(Continued)

OTHER PUBLICATIONS

Grondahl et al. "Film Riding Leaf Seals for Improved Shaft Sealing", Proceedings of ASME Turbo Expo 2010: Power for Land, Sea and Air, Jun. 14-18, 2010.

(Continued)

*Primary Examiner* — Eugene G Byrd
(74) *Attorney, Agent, or Firm* — Getz Balich LLC

(57) ABSTRACT

An assembly is provided for rotational equipment. This assembly includes a plurality of seal shoes, a seal base and a spring system. The seal shoes are arranged about a centerline in an annular array. The seal shoes include a first seal shoe. The seal base circumscribes the seal shoes. The spring system connects the seal shoes to the seal base. The spring system includes a first spring element and a second spring element. The first spring element extends axially along the centerline in a first axial direction from the seal base to the first seal shoe. The second spring element extends axially along the centerline in a second axial direction from the seal base to the first seal shoe. The second axial direction is opposite the first axial direction.

20 Claims, 12 Drawing Sheets

(56) References Cited

U.S. PATENT DOCUMENTS

| | | |
|---|---|---|
| 7,726,660 B2 | 6/2010 | Datta |
| 8,172,232 B2 | 5/2012 | Justak |
| 8,919,781 B2 | 12/2014 | Justak |
| 9,145,785 B2 | 9/2015 | Bidkar |
| 9,359,908 B2 | 6/2016 | Bidkar |
| 10,082,039 B2 | 9/2018 | Hanson |
| 10,184,347 B1 | 1/2019 | D'Ambruoso |
| 10,190,431 B2 * | 1/2019 | Bidkar .................. F16J 15/447 |
| 11,359,726 B2 * | 6/2022 | Hilbert .................. F16J 15/445 |
| 2008/0265513 A1 | 10/2008 | Justak |
| 2011/0304101 A1 | 12/2011 | Grondahl |
| 2012/0223483 A1 | 9/2012 | Bidkar |
| 2013/0259660 A1 | 10/2013 | Dale |
| 2014/0008871 A1 | 1/2014 | Bidkar |
| 2014/0050564 A1 | 2/2014 | Hagan |
| 2014/0062024 A1 * | 3/2014 | Bidkar .................. F01D 11/04 277/303 |
| 2014/0119912 A1 * | 5/2014 | Bidkar .................. F01D 11/025 277/412 |
| 2016/0010480 A1 * | 1/2016 | Bidkar .................. F16J 15/4478 277/303 |
| 2016/0102570 A1 | 4/2016 | Wilson |
| 2016/0109025 A1 | 4/2016 | McCaffrey |
| 2016/0115804 A1 * | 4/2016 | Wilson .................. F01D 11/00 277/503 |
| 2016/0115805 A1 * | 4/2016 | Gibson .................. F01D 11/16 415/173.5 |
| 2016/0130963 A1 | 5/2016 | Wilson |
| 2017/0226883 A1 * | 8/2017 | Peters .................. F01D 5/02 |
| 2018/0372229 A1 | 12/2018 | Bidkar |
| 2019/0072186 A1 | 3/2019 | Bidkar |
| 2019/0218926 A1 * | 7/2019 | DiFrancesco .......... F01D 11/14 |
| 2020/0217422 A1 * | 7/2020 | Grover .................. F01D 11/16 |
| 2020/0318687 A1 * | 10/2020 | Davis .................. F16J 15/442 |
| 2020/0362716 A1 * | 11/2020 | Glahn .................. F16J 15/36 |

FOREIGN PATENT DOCUMENTS

| | | | |
|---|---|---|---|
| WO | 2016179608 W | 11/2016 | |
| WO | WO-2019106024 A1 * | 6/2019 | ............ F01D 11/025 |

OTHER PUBLICATIONS

EP Search Report for EP Patent Application No. 24172014.3 dated Aug. 13, 2024.

* cited by examiner

NON-CONTACT SEAL ASSEMBLY WITH MULTIPLE SPACED SPRING ELEMENTS

This application claims priority to U.S. patent application Ser. No. 16/919,444 dated Jul. 2, 2020 which is hereby incorporated herein by reference in its entirety.

BACKGROUND OF THE DISCLOSURE

1. Technical Field

This disclosure relates generally to rotational equipment and, more particularly, to a non-contact seal for the rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal can generate a significant quantity of heat that can reduce efficiency of the rotational equipment as well as subject other components of the rotational equipment to high temperatures and internal stresses. To accommodate these high temperatures and stresses, certain components of the rotational equipment may be constructed from specialty high temperature materials. However, these materials can significantly increase manufacturing and servicing costs as well as mass of the rotational equipment. While non-contact seals have been developed in an effort to reduce heat within rotational equipment, there is still room for improvement to provide an improved non-contact seal. In particular, there is room in the art for a non-contact seal with reduced or no frictional rubbing.

SUMMARY OF THE DISCLOSURE

According to an aspect of the present disclosure, an assembly is provided for rotational equipment. This assembly includes a plurality of seal shoes, a seal base and a spring system. The seal shoes are arranged about a centerline in an annular array. The seal shoes include a first seal shoe. The seal base circumscribes the seal shoes. The spring system connects the seal shoes to the seal base. The spring system includes a first spring element and a second spring element. The first spring element extends axially along the centerline in a first axial direction from the seal base to the first seal shoe. The second spring element extends axially along the centerline in a second axial direction from the seal base to the first seal shoe. The second axial direction is opposite the first axial direction.

According to another aspect of the present disclosure, another assembly is provided for rotational equipment. This assembly includes a plurality of seal shoes, a seal base and a spring system. The seal shoes are arranged about a centerline in an annular array. The seal shoes include a first seal shoe. The seal base extends circumferentially around the seal shoes and the centerline. The spring system connects the seal shoes to the seal base. The spring system includes a first spring element and a second spring element. The first spring element is axially between and connected to the seal base and the first seal shoe. The second spring element is axially between and connected to the seal base and the first seal shoe. The first seal shoe is axially between the first spring element and the second spring element.

According to still another aspect of the present disclosure, another assembly is provided for rotational equipment. This assembly includes a plurality of seal shoes, a seal base and a spring system. The seal shoes are arranged about a centerline in an annular array. The seal shoes include a first seal shoe and a second seal shoe. The seal base extends circumferentially around the plurality of seal shoes and the centerline. The spring system connects the seal shoes to the seal base. The spring system includes a first spring element, a second spring element, a third spring element and a fourth spring element. The first spring element is arranged towards a first axial side of the first seal shoe. The first spring element is connected to and is between the first seal shoe and the seal base. The second spring element is arranged towards a second axial side of the first seal shoe. The second spring element is connected to and is between the first seal shoe and the seal base. The third spring element is arranged towards a first axial side of the second seal shoe. The third spring element is connected to and is between the second seal shoe and the seal base. The fourth spring element is arranged towards a second axial side of the second seal shoe. The fourth spring element is connected to and is between the second seal shoe and the seal base. The first seal shoe and the second seal shoe are laterally separated by a first lateral distance. The first spring element and the third spring element are laterally separated by a second lateral distance that is equal to the first lateral distance.

The seal base may include a first flange that radially overlaps the first seal shoe. The first spring element may extend axially from the first flange to the first seal shoe.

The seal base may also include a second flange that radially overlaps the first seal shoe. The second spring element may extend axially from the second flange to the first seal shoe.

A first radius may extend from the centerline to the first spring element. A second radius may extend from the centerline to the second spring element. The first radius may be equal to (or different than) the second radius.

The assembly may also include a compression spring between and engaged with the seal base and the first spring element.

The assembly may also include a compression spring between and engaged with the seal base and the first seal shoe.

The assembly may also include a damper between and connected to the seal base and the first seal shoe.

The seal base may include a seal shoe stop configured to limit radial outward movement of the first seal shoe.

A vent aperture may extend through the seal shoe stop.

A vent aperture may extend through the first spring element.

A vent aperture may extend through the first seal shoe.

The first seal shoe may project axially beyond the seal base.

The first spring element may extend axially along the centerline in the first axial direction from the seal base to the first seal shoe for a first axial distance. The second spring element may extend axially along the centerline in the second axial direction from the seal base to the first seal shoe for a second axial distance. The second axial distance may be different than (or equal to) the first axial distance.

The first spring element may have a straight, linear sectional geometry as the first spring element extends from the seal base to the first seal shoe. In addition or alternatively, the second spring element may have a straight, linear sectional geometry as the second spring element extends from the seal base to the first seal shoe.

At least a portion of the first spring element may have a tortuous sectional geometry as the first spring element extends away from the seal base towards the first seal shoe. In addition or alternatively, at least a portion of the second spring element may have a tortuous sectional geometry as the second spring element extends away from the seal base towards the first seal shoe.

The spring system may also include one or more additional spring elements connected to and extending between the seal base and the first seal shoe.

The first seal shoe may have a first seal shoe lateral width. The first spring element may have a first spring element lateral width that is equal to the first seal shoe lateral width. In addition or alternatively, the second spring element may have a second spring element lateral width that is equal to the first seal shoe lateral width.

The assembly may also include a stationary structure, a rotating structure and a seal assembly. The rotating structure may be configured to rotate about the centerline. The seal assembly may include the seal shoes, the seal base and the spring system. The seal assembly may be configured to seal a gap between the stationary structure and the rotating structure. The seal shoes may be arranged circumferentially about and sealingly engage the rotating structure. The seal base may be mounted to the stationary structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
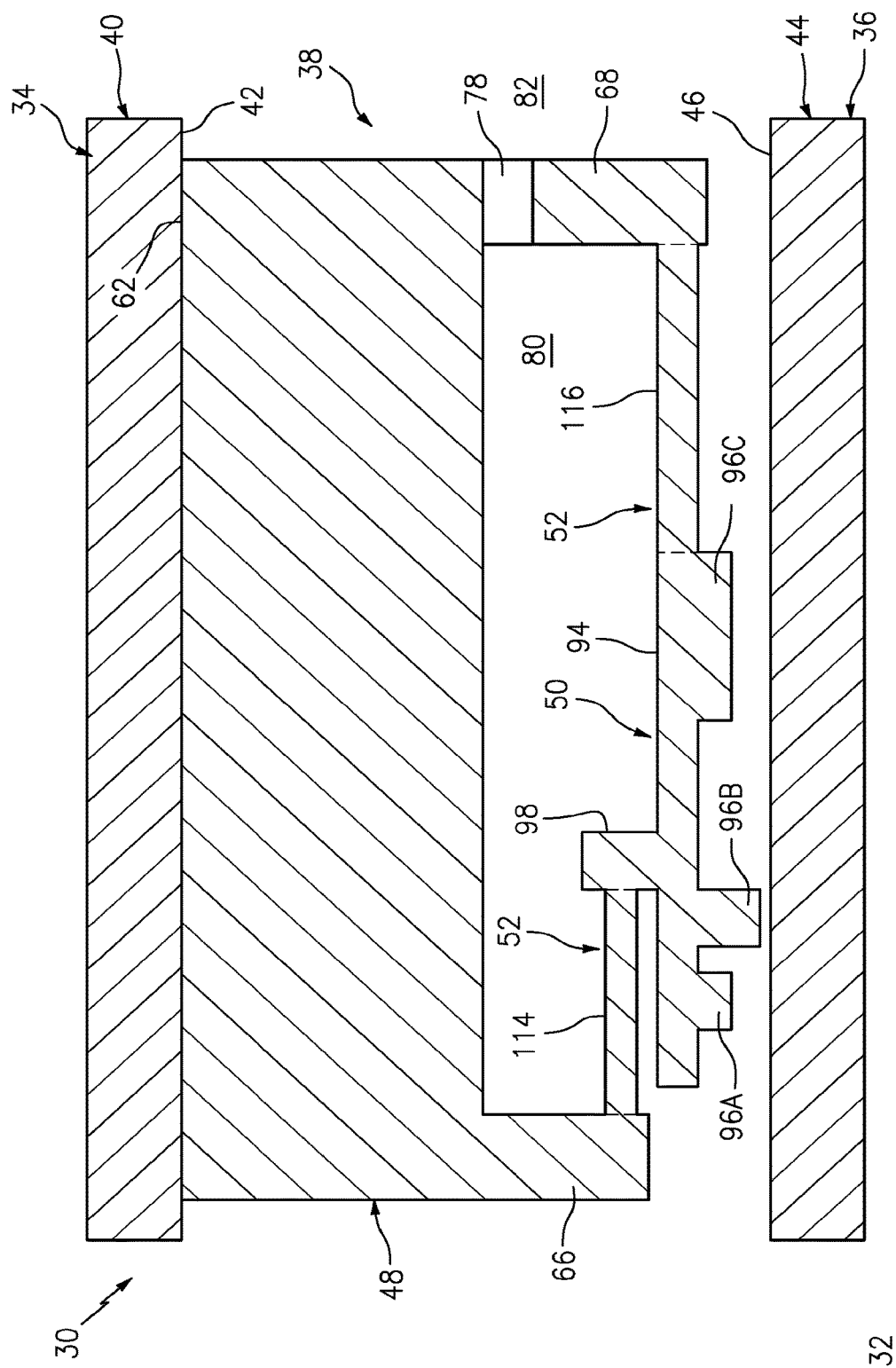
FIG. 1 is a partial side sectional illustration of an assembly for rotational equipment.

FIG. 1 illustrates an assembly 30 for rotational equipment with an axial centerline 32, which centerline 32 may also be an axis of rotation (e.g., a rotational axis) for one or more components of the rotational equipment assembly 30. An example of such rotational equipment is a gas turbine engine for an aircraft propulsion system, an exemplary embodiment of which is described below in further detail (e.g., see FIG. 22). However, the rotational equipment assembly 30 of the present disclosure is not limited to such an aircraft or gas turbine engine application. The rotational equipment assembly 30, for example, may alternatively be configured with rotational equipment such as an industrial gas turbine engine, a wind turbine, a water turbine or any other apparatus in which a seal is provided between a stationary structure and a rotating structure; e.g., a rotor.

The rotational equipment assembly 30 of FIG. 1 includes a stationary structure 34, a rotating structure 36 and a seal assembly 38 such as, for example, an adaptable non-contact seal assembly. The seal assembly 38 is mounted with the stationary structure 34 and configured to substantially seal an annular gap between the stationary structure 34 and the rotating structure 36 as described below in further detail.

The stationary structure 34 includes a seal carrier 40. This seal carrier 40 may be a discrete, unitary annular body. Alternatively, the seal carrier 40 may be configured with another component/portion of the stationary structure 34. The seal carrier 40 has a seal carrier inner surface 42. This seal carrier inner surface 42 may be substantially cylindrical. The seal carrier inner surface 42 extends circumferentially about (e.g., completely around) and faces towards the axial centerline 32. The seal carrier inner surface 42 at least partially forms a bore in the stationary structure 34. This bore is sized to receive the seal assembly 38, which may be fixedly attached to the seal carrier 40 by, for example, a press fit connection between the seal assembly 38 and the seal carrier inner surface 42. The seal assembly 38, of course, may also or alternatively be fixedly attached to the seal carrier 40 using one or more other techniques/devices.

The rotating structure 36 includes a seal land 44. This seal land 44 may be a discrete, unitary annular body. For example, the seal land 44 may be mounted to a shaft of the rotating structure 36. Alternatively, the seal land 44 may be configured with another component/portion of the rotating structure 36. For example, the seal land 44 may be an integral part of a shaft of the rotating structure 36, or another component mounted to the shaft.

The seal land 44 of FIG. 1 has a seal land outer surface 46. This seal land outer surface 46 may be substantially cylindrical. The seal land outer surface 46 extends circumferentially about (e.g., completely around) and faces away from the axial centerline 32. The seal land outer surface 46 is configured to face towards and is axially aligned with the seal carrier inner surface 42. While FIG. 1 illustrates the seal land outer surface 46 and the seal carrier inner surface 42 with approximately equal axial lengths along the axial centerline 32, the seal land outer surface 46 may alternatively be longer or shorter than the seal carrier inner surface 42 in other embodiments.

The seal assembly 38 is configured as an annular seal assembly such as, but not limited to, a non-contact hydrostatic seal device. The seal assembly 38 of FIG. 1 includes a seal base 48, a plurality of seal shoes 50 and a spring system 52.

The seal base 48 may be configured as an annular full hoop body. The seal base 48 of FIG. 2 extends circumferentially about (e.g., completely around) the axial centerline 32. The seal base 48 is configured to extend circumferentially around and thereby circumscribe and support the seal shoes 50 as well as the spring system 52 and its components (e.g., spring elements); see FIG. 3. Referring to FIG. 3, the seal base 48 extends axially along the axial centerline 32 between and forms a seal base high pressure side (HPS) end 54 and a seal base low pressure side (LPS) end 56. The seal base 48 extends radially between and forms a seal base inner side 58 and a seal base outer side 60, where a surface 62 of the seal base 48 at the seal base outer side 60 radially engages (e.g., is press fit against or otherwise contacts) the stationary structure 34 and its inner surface 42.

The seal base 48 may have a generally U-shaped sectional geometry. The seal base 48 of FIG. 3, for example, includes an outer tubular base 64, a high pressure side (HPS) flange 66 (e.g., an annular rim) and a low pressure side (LPS) flange 68 (e.g., an annular rim). The outer tubular base 64 is arranged at (e.g., on, adjacent or proximate) the seal base outer side 60. The outer tubular base 64 extends axially along the axial centerline 32 between and to the seal base HPS end 54 and the seal base LPS end 56. The HPS flange 66 is arranged at the seal base HPS end 54. The HPS flange 66 projects radially inwards, towards the axial centerline 32, from the outer tubular base 64 to a distal end at the seal base inner side 58. The LPS flange 68 is arranged at the seal base LPS end 56. The LPS flange 68 projects radially inwards, towards the axial centerline 32, from the outer tubular base 64 to a distal end at the seal base inner side 58. Each of the flanges 66 and 68 may extend circumferentially about (e.g., completely around) the axial centerline 32.

With the foregoing configuration, a (e.g., annular) channel 70 is formed in the seal base 48. This channel 70 extends partially radially, in an outward direction away from the axial centerline 32, into the seal base 48 from the seal base inner side 58 to an inner surface 72 of the outer tubular base 64. The channel 70 extends within the seal base 48 axially along the axial centerline 32 between opposing surfaces 74 and 76 of the HPS and the LPS flanges 66 and 68. The channel 70 extends within the seal base 48 circumferentially about (e.g., completely around) the axial centerline 32.

In some embodiments, one or more of the flanges 66, 68 may include one or more vent apertures; e.g., through-holes. The LPS flange 68 of FIG. 3, for example, includes one or more vent apertures 78 (one visible in FIG. 3), which vent apertures 78 are arranged circumferentially about the axial centerline 32. Each of the vent apertures 78 extends axially through the LPS flange 68 so as to fluidly couple a plenum 80 within the seal base 48 (e.g., within the channel 70) with a plenum 82 outside of the seal assembly 38 and next to the seal base LPS end 56.

Figure 2:
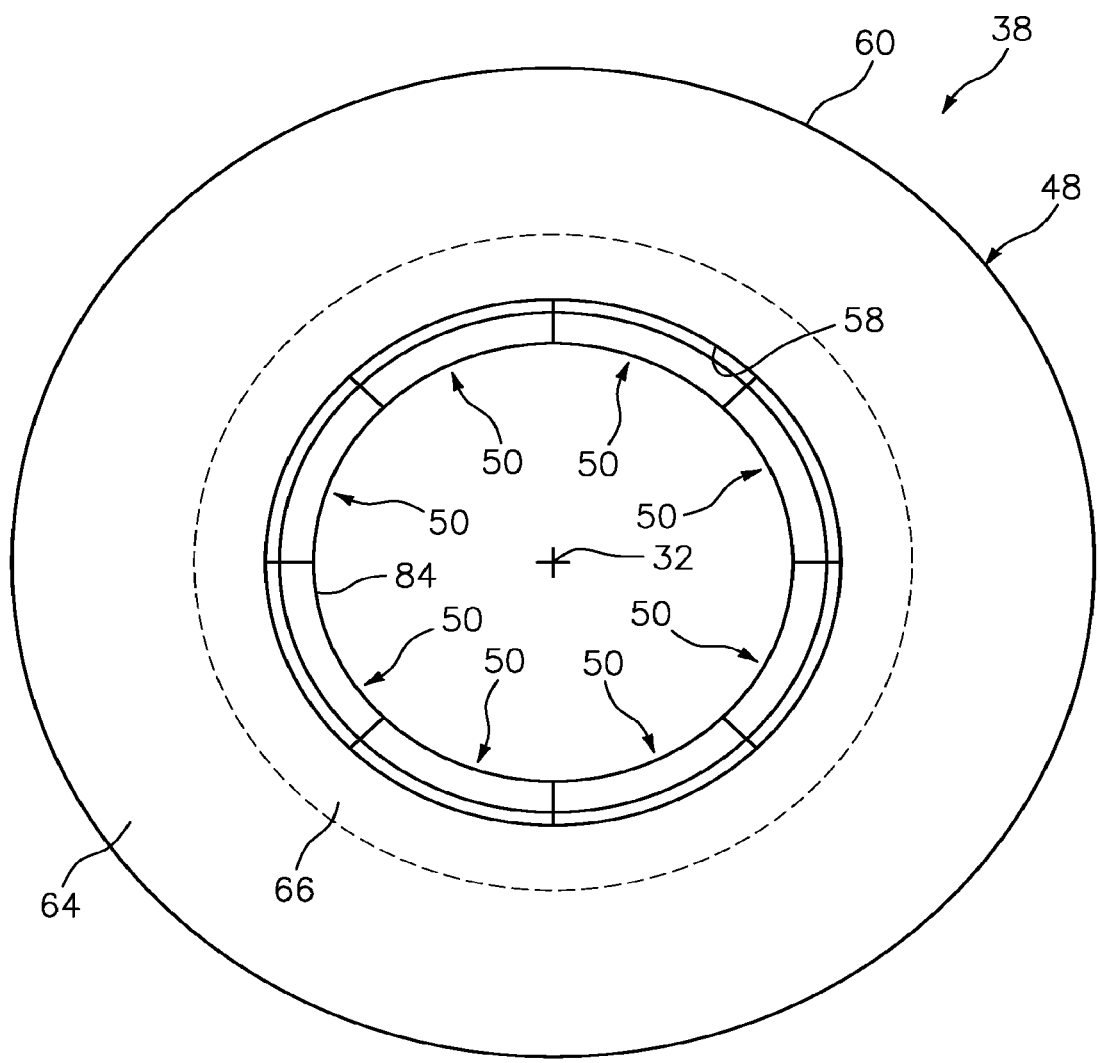
FIG. 2 is a high pressure side (HPS) end view illustration of a seal assembly of the rotational equipment assembly.
Figure 3:
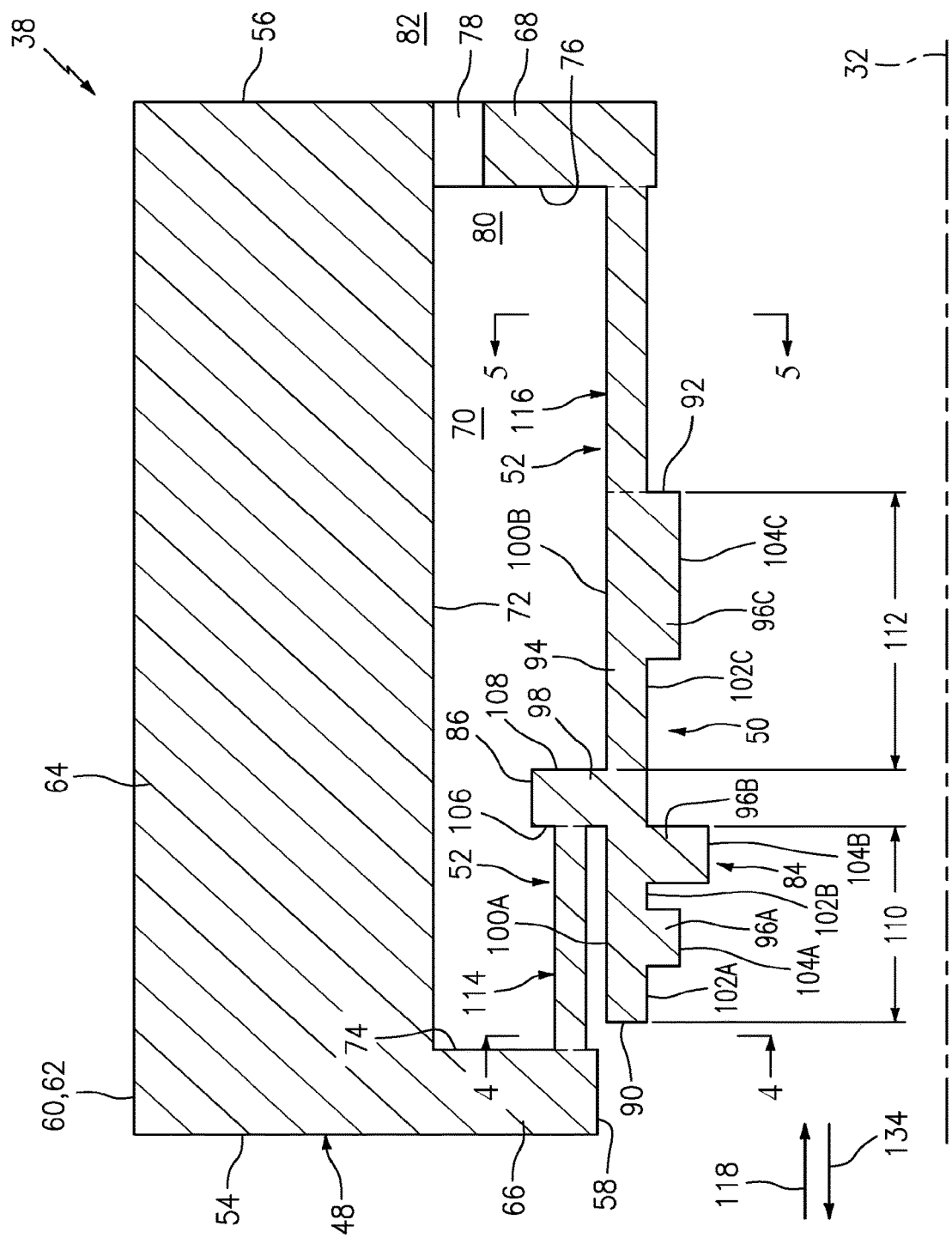
FIG. 3 is a partial side sectional illustration of the seal assembly.

Referring to FIG. 2, the seal shoes 50 may be configured as arcuate bodies and are arranged circumferentially around the axial centerline 32 in an annular array. Each of the seal shoes 50, for example, is arranged circumferentially between and next to a pair of adjacent circumferentially neighboring seal shoes 50. The annular array of the seal shoes 50 extends circumferentially about (e.g., completely around) the axial centerline 32, thereby forming an inner bore at an inner side 84 of the seal assembly 38. As best seen in FIG. 1, the inner bore is sized to receive the seal land 44, where the rotating structure 36 projects axially through (or into) the inner bore formed by the seal shoes 50.

Figure 4:
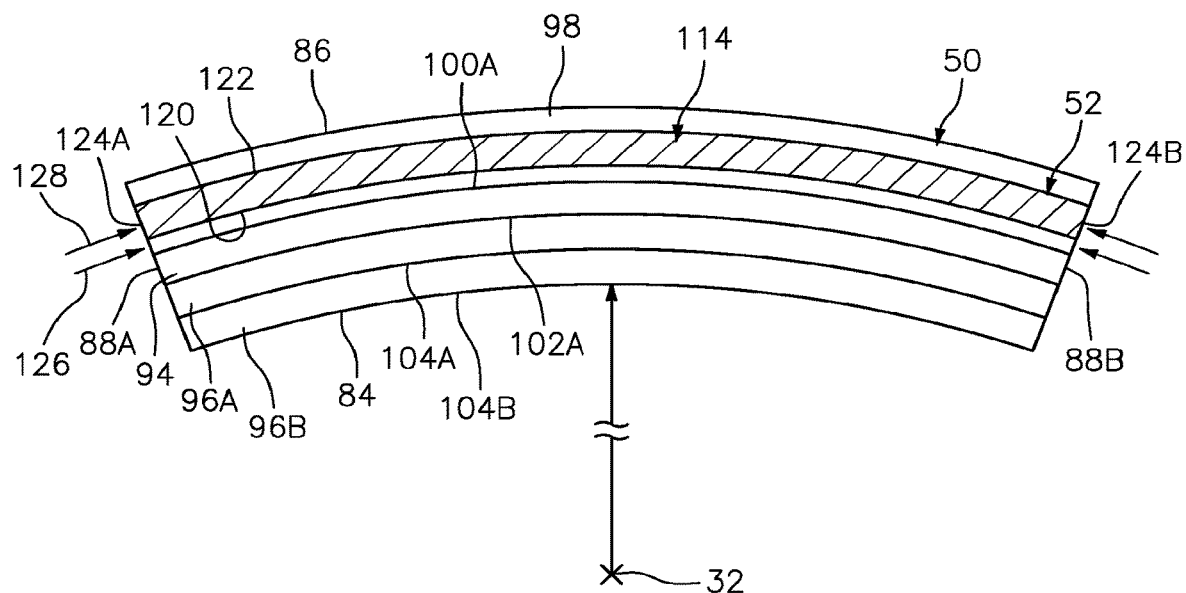
FIG. 4 is an HPS end view illustration of a portion of the seal assembly including a seal shoe and a portion of an HPS spring element.
Figure 5:
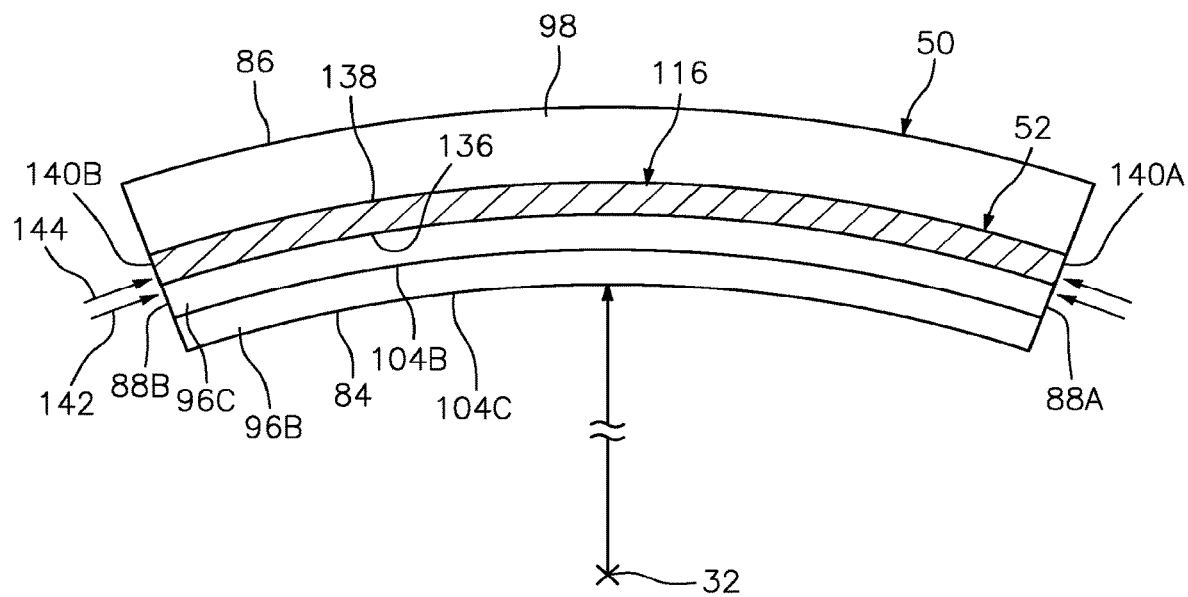
FIG. 5 is a low pressure side (LPS) end view illustration of a portion of the seal assembly including the seal shoe and a portion of an LPS spring element.

Referring to FIGS. 4 and 5, each of the seal shoes 50 extends radially from the inner side 84 of the seal assembly 38 to an outer side 86 of that seal shoe 50. Each of the seal shoes 50 extends circumferentially about the axial centerline 32 between and to opposing ends 88A and 88B (generally referred to as "88") of that seal shoe 50. Referring to FIG. 3, each of the seal shoes 50 extends axially along the axial centerline 32 between a high pressure side (HPS) side 90 and a low pressure side (LPS) side 92 of the seal shoe 50. The seal shoe HPS side 90 is an upstream side relative to, for example, flow of leakage fluid across the seal assembly 38. The seal shoe LPS side 92 is a downstream side relative to, for example, the flow of leakage fluid across the seal assembly 38.

Each of the seal shoes 50 includes a seal shoe base 94 and one or more seal shoe projections 96A-C (generally referred to as "96") (e.g., rails/teeth). Each seal shoe 50 of FIG. 3 also includes a seal shoe mount 98. The seal mount 98, however, may be omitted where, for example, the spring system 52 is connected directly to the seal shoe base 94.

The seal shoe base 94 extends axially along the axial centerline 32 between the seal shoe HPS side 90 and the seal shoe LPS side 92. The seal shoe base 94 extends radially between and to one or more (e.g., arcuate) base outer surfaces 100A and 100B (generally referred to as "100") and one or more base inner surfaces 102A-C (generally referred to as "102"). Each of these base inner surfaces 102 may be an arcuate surface. Referring to FIGS. 4 and 5, the seal shoe base 94 extends circumferentially about the axial centerline 32 between and to the seal shoe ends 88A and 88B. The seal shoe base 94 includes a first end surface at the seal shoe end 88A and a second end surface at the seal shoe end 88B. Each of the end surfaces may be a flat planar surface. Each of the end surfaces, for example, may have a straight sectional geometry when viewed, for example, in a plane perpendicular to the axial centerline 32; e.g., the plane of FIG. 4 or 5.

Referring to FIG. 3, the seal shoe projections 96 are arranged at discrete axial locations along the axial centerline 32 and the seal shoe base 94. Each pair of axially adjacent/neighboring projections 96 may thereby be axially separated by an (e.g., arcuate) inter-projection gap. The seal shoe projections 96 of FIG. 3 are configured parallel to one another.

The seal shoe projections 96 are connected to (e.g., formed integral with or otherwise attached to) the seal shoe base 94. Each of the seal shoe projections 96 projects radially inwards, towards the axial centerline 32, from the seal shoe base 94 and its base inner surfaces 102 to a distal projection end.

Each of the seal shoe projections 96 has a projection inner surface 104A-C (generally referred to as "104") at the distal projection end. One or more or each of the projection inner surfaces 104 may be at the inner side 84 of the seal assembly 38. Each projection inner surface 104 may be an arcuate surface. Each projection inner surface 104, for example, may have an arcuate sectional geometry when viewed, for example, in a plane perpendicular to the axial centerline 32; e.g., the plane of FIG. 4 or 5. One or more or each of the projection inner surfaces 104 is configured to be arranged in close proximity with (but not touch) and thereby sealingly mate with the seal land outer surface 46 in a non-contact manner (see FIG. 1), where the rotating structure 36 projects axially through (or into) the inner bore formed by the seal shoes 50.

Each of the seal shoe projections 96 of FIG. 3 extends axially between opposing projection end surfaces. Each of these end surfaces extends radially between and may be contiguous with a respective one of the projection inner surfaces 104 and a respective one of the base inner surfaces 102.

One or more of the seal shoe projections 96 may have a different radial height than at least another one of the seal shoe projections 96. For example, the radial height of the intermediate projection 96B may be greater than the radial heights of the end projections 96A and 96C. The radial heights of the end projections 96A and 96C may be equal or different from one another. Of course, in other embodiments, each of the seal shoe projections 96 may have the same radial height.

The seal shoe mount 98 of FIG. 3 projects radially outward, away from the axial centerline 32, from the seal shoe base 94 and its base outer surface 100 to a distal end at the seal shoe outer side 86. The seal shoe mount 98 extends axially along the axial centerline 32 between opposing mount sides 106 and 108. Referring to FIGS. 4 and 5, the seal shoe mount 98 extends circumferentially about the axial centerline 32 between the opposing seal shoe ends 88. Referring again to FIG. 3, the seal shoe mount 98 is disposed a (e.g., non-zero) first axial distance 110 from the seal shoe HPS side 90 and a (e.g., non-zero) second axial distance 112 from the seal shoe LPS side 92. In the embodiment of FIG. 3, the first axial distance 110 is different (e.g., less, or alternatively greater) than the second first axial distance 112. The present disclosure, however, is not limited to such an exemplary embodiment. For example, in other embodiments, the first axial distance 110 may be equal to the second first axial distance 112.

The spring system 52 includes a plurality of spring element groupings, where each of the groupings is (e.g., uniquely) associated with a respective one of the seal shoes 50. For example, each of the spring element groupings is configured to respectively moveably and resiliently connect a respective one of the seal shoes 50 to the seal base 48. Each of the spring element groupings may include a plurality of spring element 114 and 116; e.g., spring beams such as, but not limited to, leaf springs, cantilevered springs, etc.

The high pressure side (HPS) spring element 114 is arranged towards and/or on the seal shoe HPS side 90. The HPS spring element 114 of FIG. 3, for example, is arranged (e.g., axially) between and connected to the seal base 48 and a respective seal shoe 50. More particularly, the HPS spring element 114 is connected to (e.g., formed integral with or otherwise attached to) the HPS flange 66 and the seal shoe mount 98. The HPS spring element 114 of FIG. 3 extends axially along the axial centerline 32 in a first axial direction 118 (e.g., left-to-right in FIG. 3) from the HPS flange 66 to the seal shoe mount 98.

Figure 6:
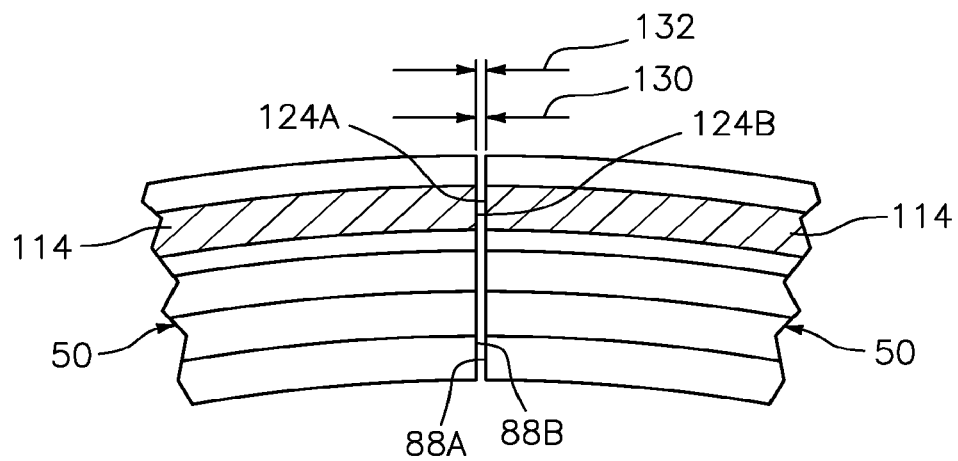
FIG. 6 is an HPS end view illustration of a portion of the seal assembly including two neighboring seal shoes and two neighboring HPS spring elements.

Referring to FIG. 4, the HPS spring element 114 extends radially between opposing inner and outer sides 120 and 122 of that HPS spring element 114. The HPS spring element 114 extends circumferentially between opposing sides 124A and 124B (generally referred to as "124") of the HPS spring element 114. Each of the HPS spring element sides 124A, 124B may be circumferentially aligned with a respective one of the seal shoe sides 88A, 88B. With such a configuration, a lateral width 126 of the seal shoe 50 connected to the HPS spring element 114 may be exactly equal to or substantially equal to (e.g., +/−1% or 2%) a lateral width 128 of the HPS spring element 114 at, for example, a common and/or proximate radial location. Referring to FIG. 6, this enables a lateral width 130 of a gap (i.e., a lateral distance) between laterally neighboring HPS spring elements 114 to be exactly equal to or substantially equal to (e.g., +/−1% or 2%) a lateral width 132 of a gap (i.e., a lateral distance) between laterally neighboring seal shoes 50. Thus, the HPS spring elements 114 may substantially seal a gap between the seal base 48 and the seal shoes 50.

Referring to FIG. 3, the low pressure side (LPS) spring element 116 is arranged towards and/or on the seal shoe LPS side 92. The LPS spring element 116 of FIG. 3, for example, is arranged (e.g., axially) between and connected to the seal base 48 and a respective seal shoe 50. More particularly, the LPS spring element 116 is connected to (e.g., formed integral with or otherwise attached to) the LPS flange 68 and the seal shoe base 94. The LPS spring element 116 of FIG. 3 extends axially along the axial centerline 32 in a second axial direction 134 (e.g., right-to-left in FIG. 3) from the LPS flange 68 to the seal shoe base 94, where the second axial direction 134 is opposite the first axial direction 118. With this configuration, the seal shoe 50 is arranged axially between the LPS spring element 116 and the HPS spring element 114.

Figure 7:
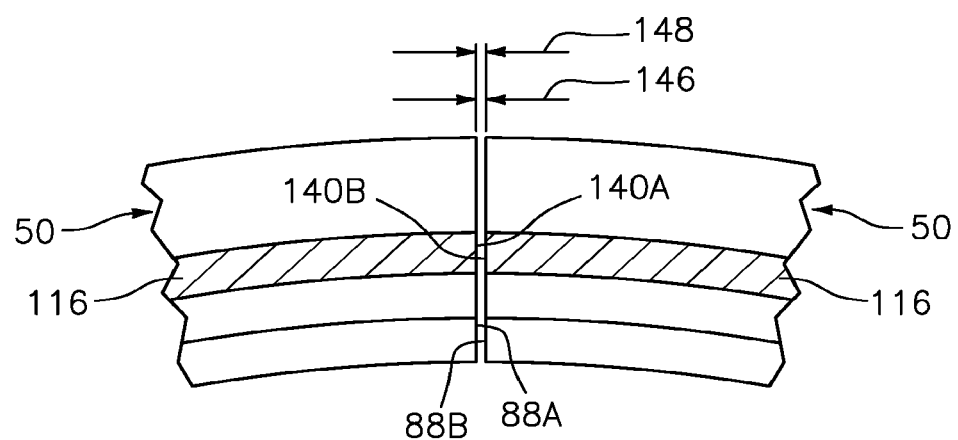
FIG. 7 is an LPS end view illustration of a portion of the seal assembly including the two neighboring seal shoes and two neighboring LPS spring elements.

Referring to FIG. 5, the LPS spring element 116 extends radially between opposing inner and outer sides 136 and 138 of that LPS spring element 116. The LPS spring element 116 extends circumferentially between opposing sides 140A and 140B (generally referred to as "140") of the LPS spring element 116. Each of the LPS spring element sides 140A, 140B may be circumferentially aligned with a respective one of the seal shoe sides 88A, 88B. With such a configuration, a lateral width 142 of the seal shoe 50 connected to the LPS spring element 116 may be exactly equal to or substantially equal to (e.g., +/−1% or 2%) a lateral width 144 of the LPS spring element 116. Referring to FIG. 7, this enables a lateral width 146 of a gap (i.e., a lateral distance) between laterally neighboring LPS spring elements 116 to be exactly equal to or substantially equal to (e.g., +/−1% or 2%) a lateral width 148 of a gap (i.e., a lateral distance) between laterally neighboring seal shoes 50. Thus, the LPS spring elements 116 may substantially seal a gap between the seal base 48 and the seal shoes 50.

During operation of the seal assembly 38 of FIG. 1, rotation of the rotating structure 36 may develop aerodynamic forces and apply a fluid pressure to the seal shoes 50 causing each seal shoe 50 to respectively move radially relative to the seal land outer surface 46. The fluid velocity may increase as a gap between a respective seal shoe 50 and the seal land outer surface 46 increases, thus reducing pressure in the gap and drawing the seal shoe 50 radially inwardly toward the seal land outer surface 46. As the gap closes, the velocity may decrease and the pressure may increase within the gap, thus, forcing the seal shoe 50 radially outwardly from the seal land outer surface 46. The respective spring elements 114 and 116 may deflect and move with the seal shoe 50 to enable sealing the gap between the seal land outer surface 46 and seal shoe projections 96 within predetermined design tolerances.

Figure 8:
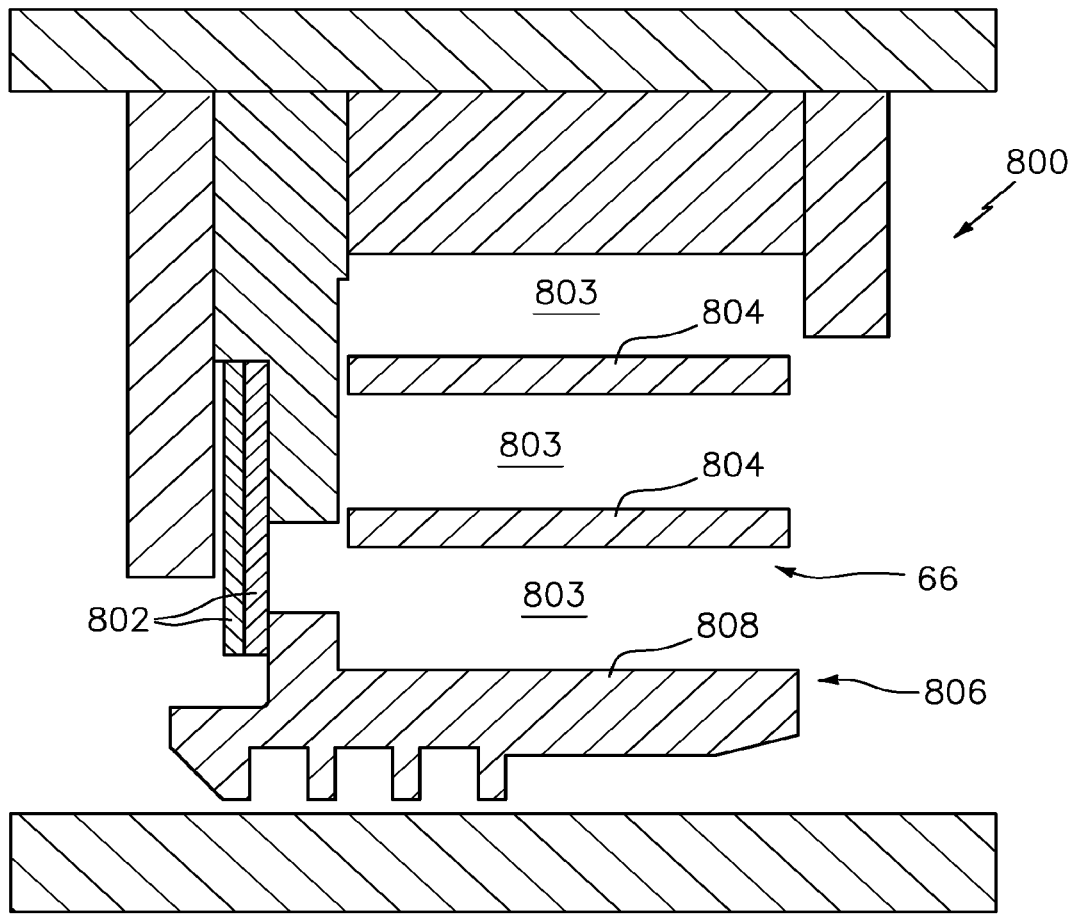
FIG. 8 is a partial side sectional illustration of a prior art seal assembly.

Since the spring elements 114 and 116 seal respective gaps between the seal shoes 50 and the seal base 48 as discussed above, the seal assembly 38 may be configured without any additional secondary seals. By contrast, a seal assembly 800 as shown in FIG. 8 includes at least one secondary seal 802 for sealing fluid passages 803 adjacent laterally extending spring beams 804 of a primary seal device 806. The secondary seal 802 axially engages a respective surface of each seal shoe 808. Friction at this engagement between the secondary seal 802 and the seal shoes 808 may influence movement of the seal shoes 808 radially inward and outward. More particularly, depending upon a pressure differential across the secondary seal 802, the friction may delay and/or slow movement of the seal shoes 808 and/or completely prevent, for example, movement of the seal shoes 808. Therefore, since the seal assembly 38 of FIG. 1 may be configured without secondary seals or other seals which utilize, for example, a rubbing and/or sliding contact, the seal assembly 38 of FIG. 1 may operate without such frictional impediments as discussed above with respect to the seal assembly 800 of FIG. 8.

Figure 9:
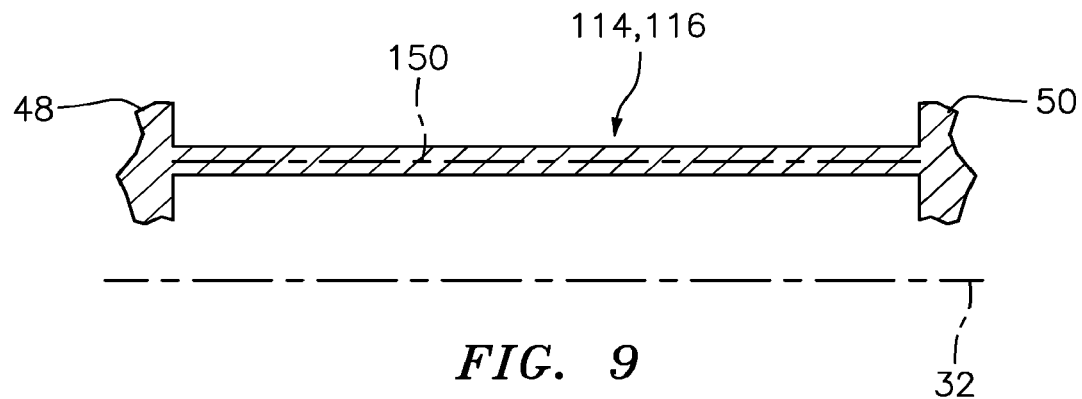
FIG. 9 is a side sectional illustration of a spring element between opposing portions of the seal assembly of the present disclosure.

In some embodiments, referring to FIG. 9, one or more or each of the spring elements 114, 116 may have a straight, linear sectional geometry when viewed, for example, in a plane coincident with and parallel with the axial centerline 32; e.g., the plane of FIG. 9. Each respective spring element 114, 116, for example, may have and follow a straight, linear centerline 150 as that spring element 114, 116 extends from the seal base 48 to the seal shoe 50. In the embodiment of FIG. 9, the centerline 150 and, thus, the spring element 114, 116 is arranged parallel with the axial centerline 32. However, in other embodiments, the centerline 150 and, thus, the spring element 114, 116 may be arranged non-parallel with the axial centerline 32.

Figure 10:
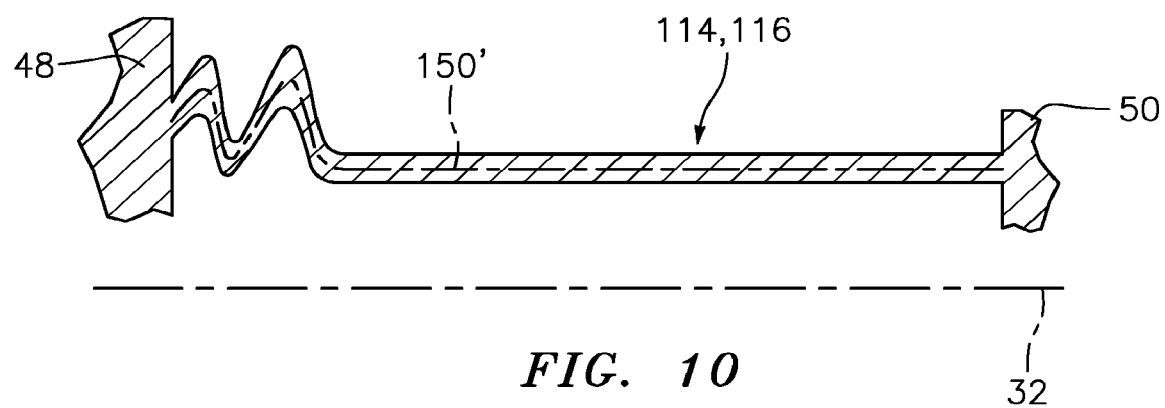
FIG. 10 is a side sectional illustration of another spring element between opposing portions of the seal assembly.

In some embodiments, one or more or each of the spring elements 114, 116 may have and follow a non-straight centerline (e.g., a curved centerline, a tortuous centerline, etc.) as that spring element 114, 116 extends between the seal base 48 and the seal shoe 50. For example, referring to FIG. 10, one or more or each of the spring elements 114, 116 may have a tortuous (e.g., crenulated, wavy, etc.) sectional geometry when viewed, for example, in a plane coincident with and parallel with the axial centerline 32; e.g., the plane of FIG. 10. Each respective spring element 114, 116, for example, may have and follow a centerline 150' as that spring element 114, 116 extends from the seal base 48 to the seal shoe 50. At least a portion (e.g., about 5% to 30% of the element's length) of the centerline 150' may follow a tortuous trajectory as that spring element 114, 116 extends from the seal base 48 to the seal shoe 50, which portion may (or may not) be located at (e.g., on, adjacent or proximate) a connection between the spring element 114, 116 and the seal base 48.

Figure 11:
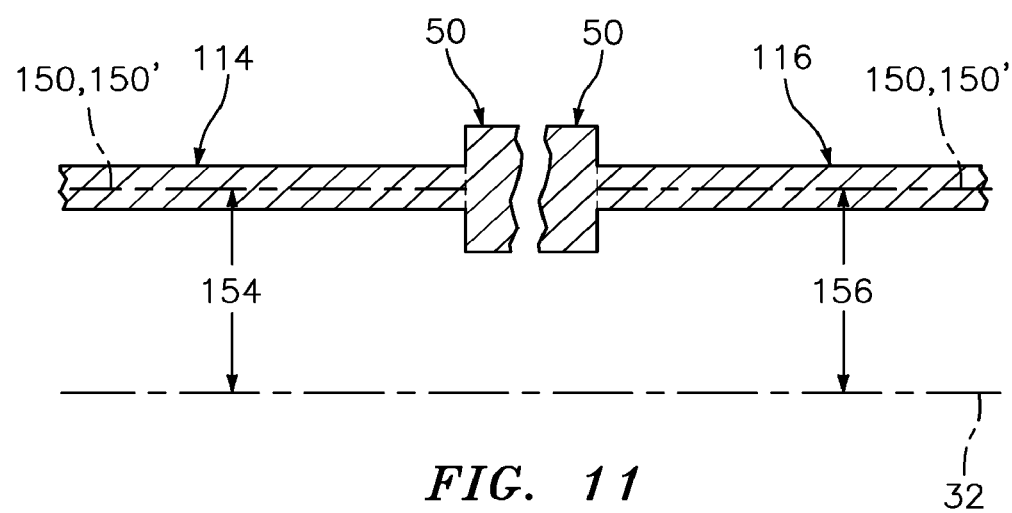
FIG. 11 is a side sectional illustration depicting an interface between HPS and LPS spring elements and a seal shoe.

In some embodiments, referring to FIG. 11, the spring elements 114 and 116 associated with a respective seal shoe 50 may be radially aligned. For example, a first radius 154 extends from the axial centerline 32 to an axial point along the centerline 150, 150' of the HPS spring element 114. A second radius 156 extends from the axial centerline 32 to an axial point along the centerline 150, 150' of the LPS spring element 116. The second radius 156 may be equal to the first radius 154 where, for example, the axial points are similarly situated; e.g., the axial points are at the connections to the seal shoe 50, at the connections to the seal base 48, at midpoints along the spring elements 114, 116, etc.

Figure 12:
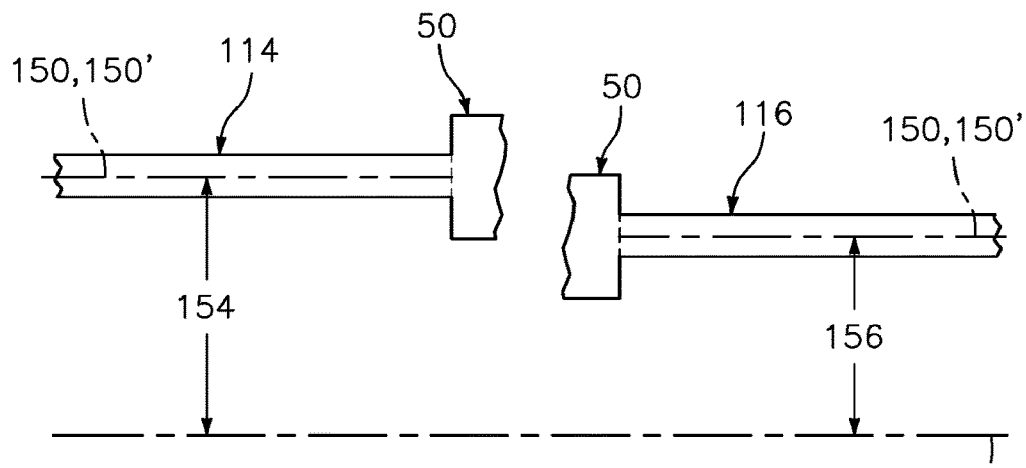
FIG. 12 is a side sectional illustration depicting another interface between the HPS and the LPS spring elements and the seal shoe.

In some embodiments, referring to FIG. 12, the spring elements 114 and 116 associated with a respective seal shoe 50 may be radially misaligned. For example, the second radius 156 may be different (e.g., less, or alternatively greater) than the first radius 154 where, for example, the axial points are similarly situated; e.g., the axial points are at the connections to the seal shoe 50, at the connections to the seal base 48, at midpoints along the spring elements 114, 116, etc.

Figure 13:
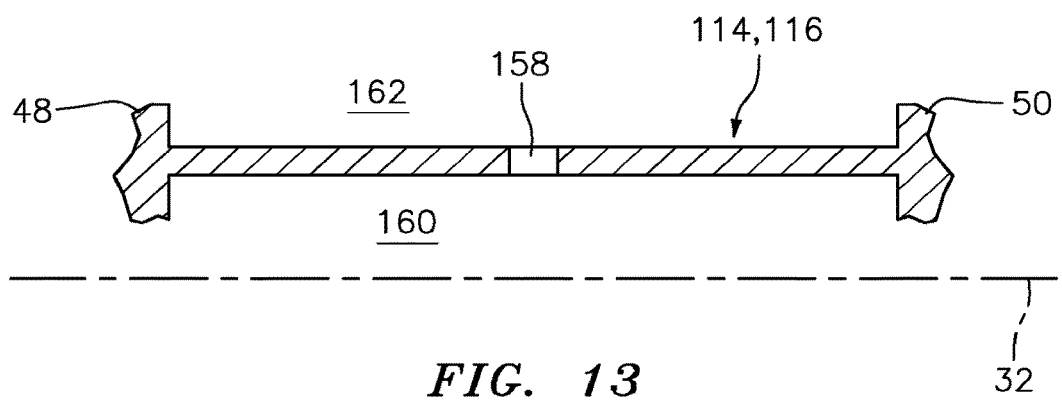
FIG. 13 is a side sectional illustration of another spring element between opposing portions of the seal assembly.

In some embodiments, referring to FIG. 13, one or more or each of the spring elements 114, 116 may have at least one vent aperture 158; e.g., a through-hole. This vent aperture 158 extends (e.g., radially) through the respective spring element 114, 116. The vent aperture 158 is configured to fluidly couple a plenum 160 below (radially inwards of) the spring element 114, 116 with a plenum 162 above (radially outboard of) the spring element 114, 116.

Figure 14:
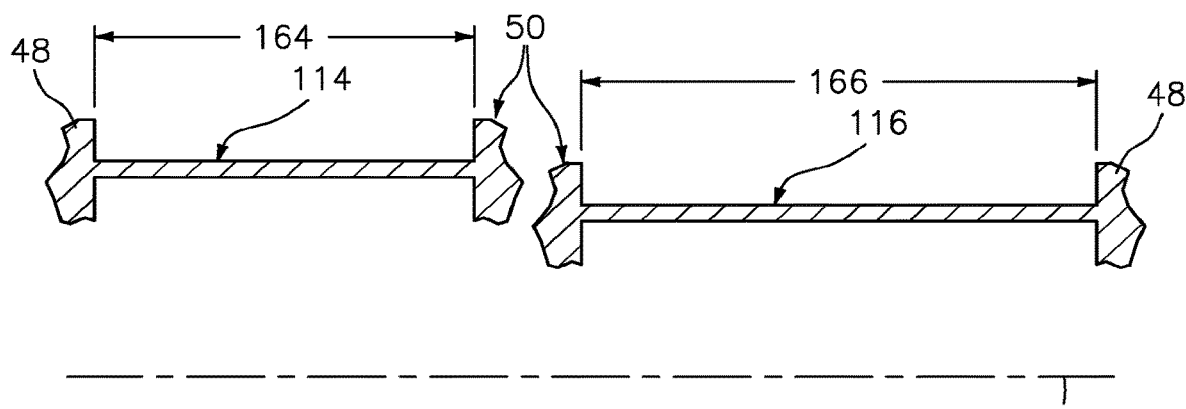
FIG. 14 is a side sectional illustration depicting HPS and LPS spring elements connecting a seal shoe with a seal base.

In some embodiments, referring to FIG. 14, each HPS spring element 114 extends a first axial distance 164 along the axial centerline 32 from the seal base 48 to a respective seal shoe 50. Each LPS spring element 116 extends a second axial distance 166 along the axial centerline 32 from the seal base 48 to the respective seal shoe 50. The second axial distance 166 may be different (e.g., greater, or alternatively less) than (or equal to) the first axial distance 164.

In some embodiments, referring to FIG. 1, each HPS spring element 114 and each LPS spring element 116 associated with a common seal shoe 50 may be connected to different portions of the seal shoe 50. The HPS spring element 114, for example, is connected to the seal shoe mount 98 whereas the LPH spring element 116 is connected to the seal shoe base 94. Of course, in other embodiments, this may be reversed such that the HPS spring element 114 is connected to the seal shoe base 94 whereas the LPH spring element is connected to the seal shoe mount 98.

Figure 15:
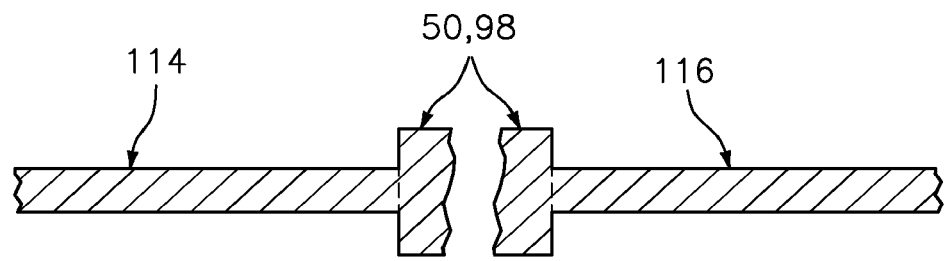
FIG. 15 is a side sectional illustration depicting another interface between the HPS and the LPS spring elements and the seal shoe.
Figure 16:
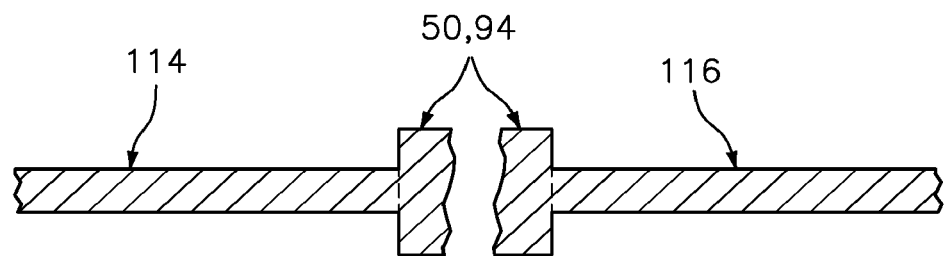
FIG. 16 is a side sectional illustration depicting still another interface between the HPS and the LPS spring elements and the seal shoe.

In some embodiments, referring to FIGS. 15 and 16, each HPS spring element 114 and each LPS spring element 116 associated with a common seal shoe 50 may be connected to a common portion of the seal shoe 50. The spring elements 114 and 116 of FIG. 15, for example, are both connected to the seal shoe mount 98. In another example, the spring elements 114 and 116 of FIG. 16 are both connected to the seal shoe base 94.

In some embodiments, referring to FIG. 1, the HPS flange 66 may radially overlap at least a portion of the seal shoes 50. The HPS flange 66 in FIG. 1, for example, radially overlaps at least a portion or an entirety of each seal shoe mount 98.

In some embodiments, still referring to FIG. 1, the LPS flange 68 may radially overlap at least a portion of the seal shoes 50. The LPS flange 68 in FIG. 1, for example, radially overlaps each seal shoe mount 98 as well as at least a portion or an entirety of each seal shoe base 94.

Figure 17:
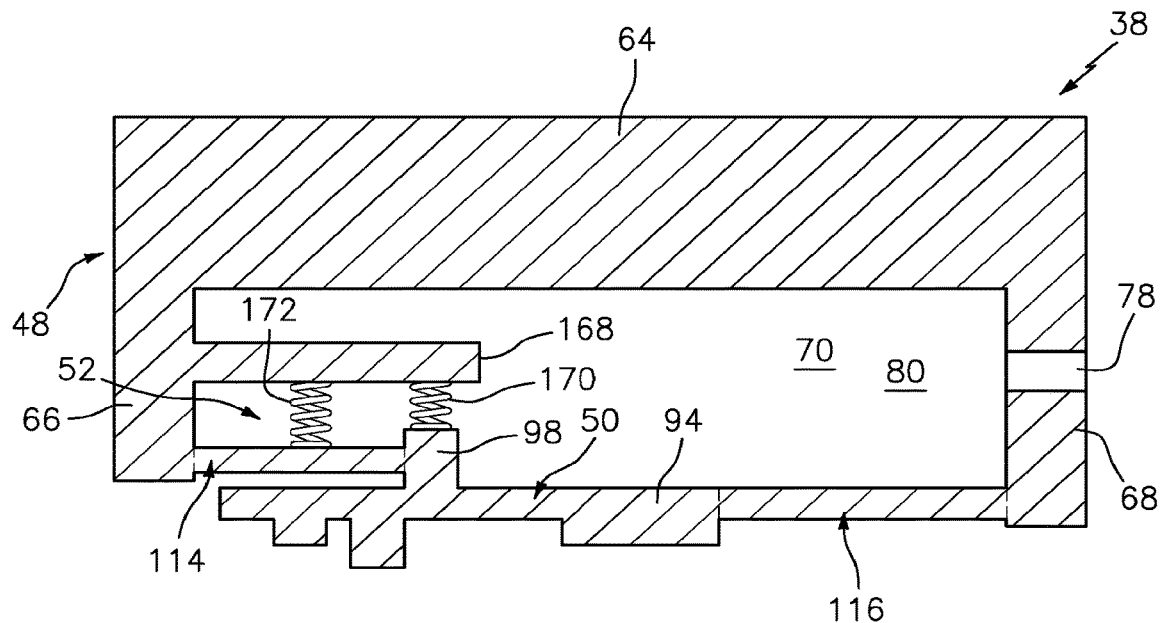
FIG. 17 is a partial side sectional illustration of the seal assembly configured with a seal shoe stop and a plurality of compression springs.

In some embodiments, referring to FIG. 17, the seal base 48 may include a seal shoe stop 168. This seal shoe stop 168 is configured to limit radial outward movement of one or more or each of the seal shoes 50. The seal shoe stop 168, for example, may project axially out from the HPS flange 66 and into the channel 70. This seal shoe stop 168 may be radially engaged (e.g., contacted) by one or more of the seal shoes 50 and its mounts 98 when the seal shoe(s) 50 moves a predetermined radial distance outward from its nominal (at rest) position, thereby limiting radial movement of the seal shoe(s) 50.

In some embodiments, still referring to FIG. 17, the spring system 52 may also include a compression spring 170 (e.g., radially) between and engaging (e.g., contacting and/or connected to) the seal base 48 (e.g., the seal shoe stop 168) and the seal shoe 50 (e.g., the seal shoe mount 98). This compression spring 170 may be configured to preload the respective seal shoe 50 in an inward direction.

In some embodiments, still referring to FIG. 17, the spring system 52 may also include a compression spring 172 (e.g., radially) between and engaging (e.g., contacting and/or connected to) the seal base 48 (e.g., the seal shoe stop 168) and one of the spring elements 114, 116 (e.g., the HPS spring element 114). This compression spring 172 may similarly be configured to preload the respective seal shoe 50 in an inward direction.

Figure 18:
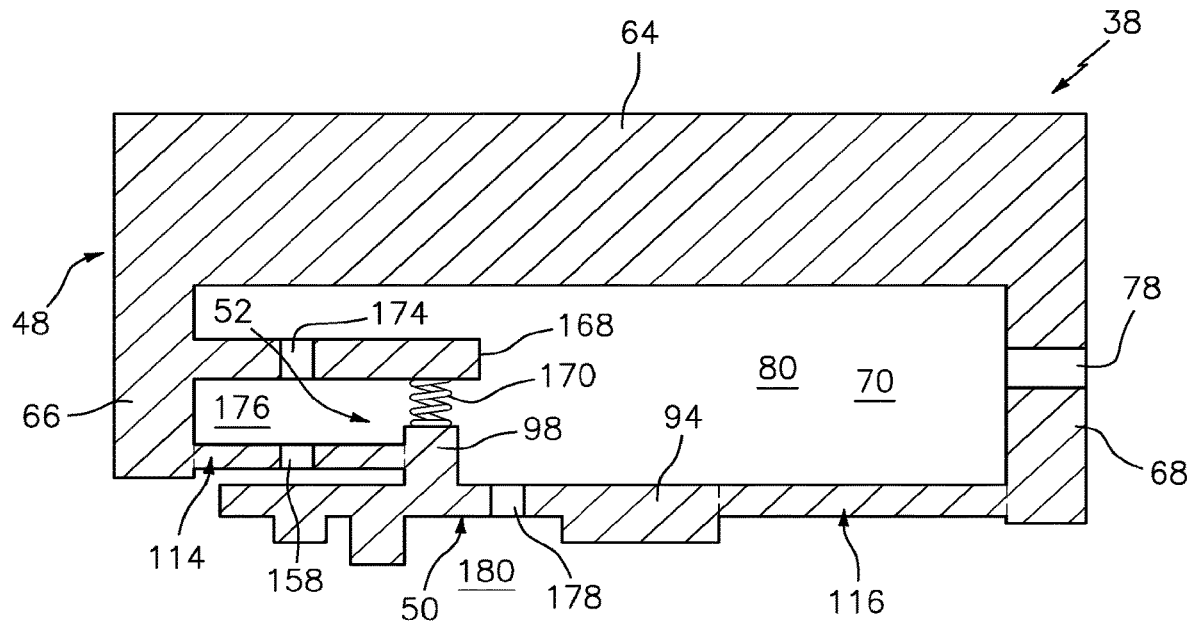
FIG. 18 is a partial side sectional illustration of the seal assembly configured with a seal shoe stop, a compression spring and a plurality of vent apertures.

In some embodiments, referring to FIG. 18, the seal shoe stop 168 may have at least one vent aperture 174; e.g., a through-hole. This vent aperture 174 extends (e.g., radially) through the seal shoe stop 168. The vent aperture 174 is configured to fluidly couple a plenum 176 below (radially inwards of) the seal shoe stop 168 with a plenum (e.g., 80) above (radially outboard of) the seal shoe stop 168.

In some embodiments, still referring to FIG. 18, one or more or each seal shoe 50 may have at least one vent aperture 178; e.g., a through-hole. This vent aperture 178 extends (e.g., radially) through the respective seal shoe 50. The vent aperture 178 is configured to fluidly couple a plenum 180 below (radially inwards of) the respective seal shoe with a plenum (e.g., 80) above (radially outboard of) the respective seal shoe 50.

Figure 19:
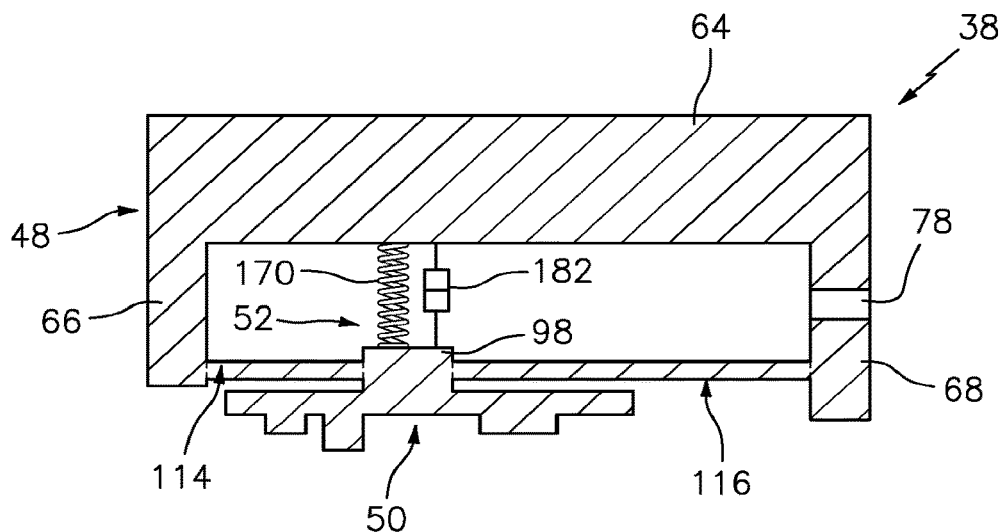
FIG. 19 is a partial side sectional illustration of the seal assembly configured with a compression spring and a damper.

In some embodiments, referring to FIG. 19, the seal assembly 38 may include one or more dampers 182; e.g., mechanical dampers. Each damper 182 may be arranged (e.g., radially) between and engaged with (e.g., contacting and/or connected to) the seal base 48 and a respective seal shoe 50 (e.g., the seal shoe mount 98). This damper 182 may be configured to remove flutter and/or other vibrations during movement of the seal shoe 50.

Figure 20:
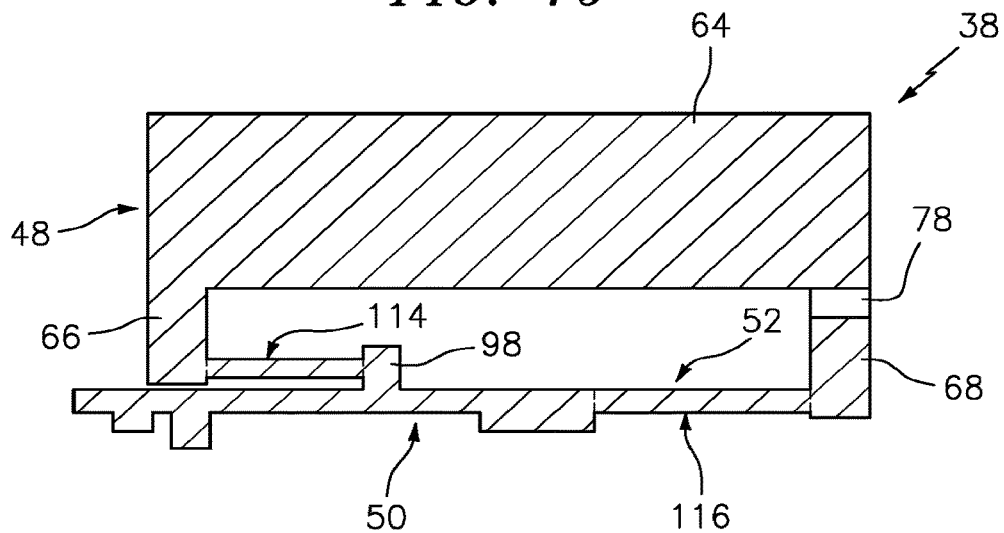
FIG. 20 is a partial side sectional illustration of the seal assembly configured with an extended seal shoe.

In some embodiments, referring to FIG. 20, one or more or each seal shoe 50 may project axially beyond the seal base 48. The seal shoe 50 in FIG. 20, for example, projects axially past the HPS flange 66.

Figure 21:
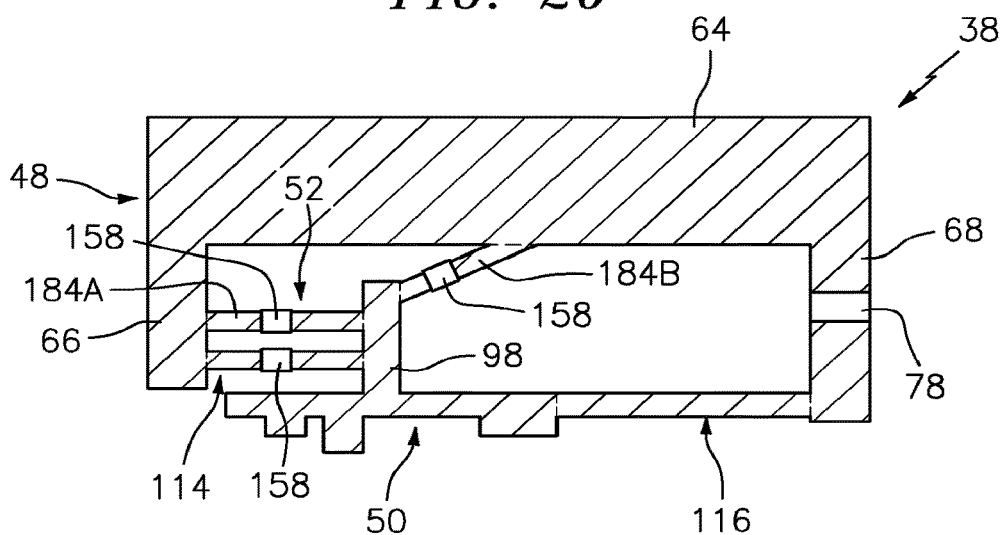
FIG. 21 is a partial side sectional illustration of the seal assembly configured with one or more additional spring elements.

In some embodiments, referring to FIG. 21, the spring system 52 may include one or more additional spring elements 184A and 184B (generally referred to as "184") (e.g., spring beams) between and connected to the seal base 48 and a respective seal shoe 50.

Each of the foregoing embodiments may be combined with any one or more of the other embodiments.

Figure 22:
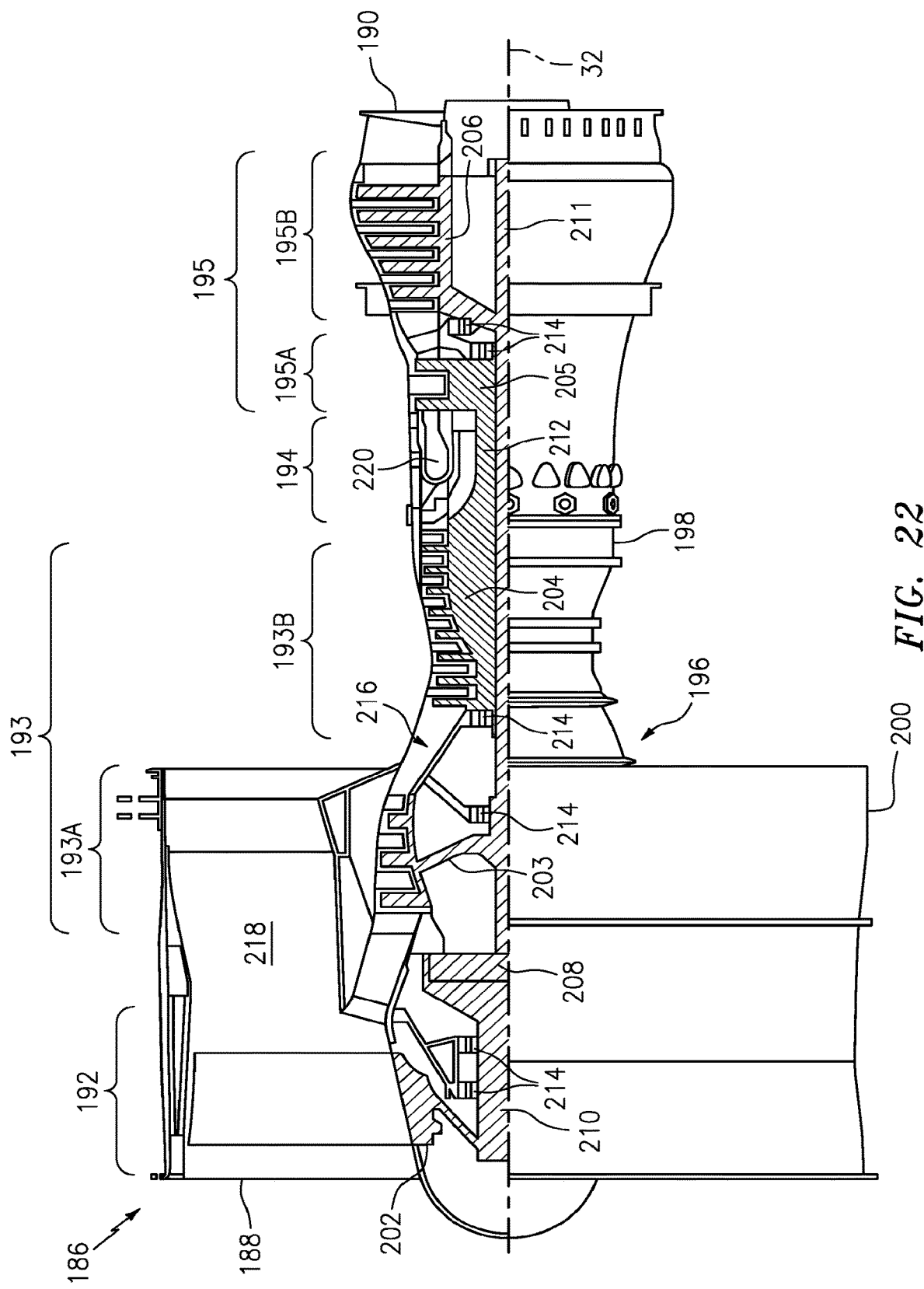
FIG. 22 is a side cutaway illustration of a gas turbine engine which may be configured with the rotational equipment assembly.

As described above, the rotational equipment assembly 30 of the present disclosure may be configured with various different types and configurations of rotational equipment. FIG. 22 illustrates one such type and configuration of the rotational equipment — a geared turbofan gas turbine engine 186. This turbine engine 186 includes various stationary structures (e.g., bearing supports, hubs, cases, etc.) as well as various rotors (e.g., rotor disks, shafts, shaft assemblies, etc.) as described below, where the stationary structure 34 and the rotating structure 36 can respectively be configured as anyone of the foregoing structures in the turbine engine 186 of FIG. 22, or other structures not mentioned herein.

The turbine engine 186 of FIG. 22 extends along the axial centerline 32 between an upstream airflow inlet 188 and a downstream airflow exhaust 190. The turbine engine 186 includes a fan section 192, a compressor section 193, a combustor section 194 and a turbine section 195. The compressor section 193 includes a low pressure compressor (LPC) section 193A and a high pressure compressor (HPC) section 193B. The turbine section 195 includes a high pressure turbine (HPT) section 195A and a low pressure turbine (LPT) section 195B.

The engine sections 192-195B are arranged sequentially along the axial centerline 32 within an engine housing 196. This engine housing 196 includes an inner case 198 (e.g., a core case) and an outer case 200 (e.g., a fan case). The inner case 198 may house one or more of the engine sections 193A-195B; e.g., an engine core. The outer case 200 may house at least the fan section 192.

Each of the engine sections 192, 193A, 193B, 195A and 195B includes a respective rotor 202-206. Each of these rotors 202-206 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 202 is connected to a gear train 208, for example, through a fan shaft 210. The gear train 208 and the LPC rotor 203 are connected to and driven by the LPT rotor 206 through a low speed shaft 211. The HPC rotor 204 is connected to and driven by the HPT rotor 205 through a high speed shaft 212. The shafts 210-212 are rotatably supported by a plurality of bearings 214. Each of these bearings 214 is connected to the engine housing 196 by at least one stationary structure such as, for example, an annular support strut.

During operation, air enters the turbine engine 186 through the airflow inlet 188. This air is directed through the fan section 192 and into a core gas path 216 and a bypass gas path 218. The core gas path 216 extends sequentially through the engine sections 193A-195B. The air within the core gas path 216 may be referred to as "core air". The bypass gas path 218 extends through a bypass duct, which bypasses the engine core. The air within the bypass gas path 218 may be referred to as "bypass air".

The core air is compressed by the compressor rotors 203 and 204 and directed into a combustion chamber 220 of a combustor in the combustor section 194. Fuel is injected into the combustion chamber 220 and mixed with the compressed core air to provide a fuel-air mixture. This fuel air mixture is ignited and combustion products thereof flow through and sequentially cause the turbine rotors 205 and 206 to rotate. The rotation of the turbine rotors 205 and 206 respectively drive rotation of the compressor rotors 204 and 203 and, thus, compression of the air received from a core airflow inlet. The rotation of the turbine rotor 206 also drives rotation of the fan rotor 202, which propels bypass air through and out of the bypass gas path 218. The propulsion of the bypass air may account for a majority of thrust generated by the turbine engine 186, e.g., more than seventy-five percent (75%) of engine thrust. The turbine engine 186 of the present disclosure, however, is not limited to the foregoing exemplary thrust ratio.

The rotational equipment assembly 30 may be included in various turbine engines other than the one described above as well as in other types of rotational equipment. The rotational equipment assembly 30, for example, may be included in a geared turbine engine where a gear train connects one or more shafts to one or more rotors in a fan section, a compressor section and/or any other engine section. Alternatively, the rotational equipment assembly 30 may be included in a turbine engine configured without a gear train. The rotational equipment assembly 30 may be included in a geared or non-geared turbine engine configured with a single spool, with two spools (e.g., see FIG. 22), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a plurality of seal shoes arranged about a centerline in an annular array, the plurality of seal shoes comprising a first seal shoe;
a seal base circumscribing the plurality of seal shoes; and
a spring system connecting the plurality of seal shoes to the seal base, the spring system including a first spring element and a second spring element;
the first spring element extending in a first direction from the seal base to the first seal shoe; and
the second spring element extending in a second direction from the seal base to the first seal shoe, the second direction opposite the first direction.

2. The assembly of claim 1, wherein
the seal base includes a first flange that overlaps the first seal shoe in a third direction that is perpendicular to the first direction; and
the first spring element extends in the first direction from the first flange to the first seal shoe.

3. The assembly of claim 2, wherein
the seal base further includes a second flange that overlaps the first seal shoe in the third direction; and
the second spring element extends in the second direction from the second flange to the first seal shoe.

4. The assembly of claim 1, wherein
a first radius extends from the centerline to the first spring element;
a second radius extends from the centerline to the second spring element; and
the first radius is equal to the second radius.

5. The assembly of claim 1, wherein
a first radius extends from the centerline to the first spring element;
a second radius extends from the centerline to the second spring element; and
the first radius is different than the second radius.

6. The assembly of claim 1, further comprising a compression spring between and engaged with the seal base and the first spring element.

7. The assembly of claim 1, further comprising a compression spring between and engaged with the seal base and the first seal shoe.

8. The assembly of claim 1, further comprising a damper between and connected to the seal base and the first seal shoe.

9. The assembly of claim 1, wherein the seal base includes a seal shoe stop configured to limit outward movement of the first seal shoe.

10. The assembly of claim 9, wherein a vent aperture extends through the seal shoe stop.

11. The assembly of claim 1, wherein a vent aperture extends through the first spring element or the first seal shoe.

12. The assembly of claim 1, wherein the first seal shoe projects axially beyond the seal base.

13. The assembly of claim 1, wherein
the first spring element extends in the first direction from the seal base to the first seal shoe for a first distance;
the second spring element extends in the second direction from the seal base to the first seal shoe for a second distance; and
the second distance is different than the first distance.

14. The assembly of claim 1, wherein at least one of
the first spring element has a straight, linear sectional geometry as the first spring element extends from the seal base to the first seal shoe; or
the second spring element has a straight, linear sectional geometry as the second spring element extends from the seal base to the first seal shoe.

15. The assembly of claim 1, wherein at least one of
at least a portion of the first spring element has a tortuous sectional geometry as the first spring element extends away from the seal base towards the first seal shoe; or
at least a portion of the second spring element has a tortuous sectional geometry as the second spring element extends away from the seal base towards the first seal shoe.

16. The assembly of claim 1, wherein the spring system further includes one or more additional spring elements connected to and extending between the seal base and the first seal shoe.

17. The assembly of claim 1, wherein the first seal shoe has a first seal shoe lateral width, and at least one of
the first spring element has a first spring element lateral width that is equal to the first seal shoe lateral width; or
the second spring element has a second spring element lateral width that is equal to the first seal shoe lateral width.

18. The assembly of claim 1, further comprising:
a stationary structure;
a rotating structure configured to rotate about the centerline; and
a seal assembly including the plurality of seal shoes, the seal base and the spring system, the seal assembly configured to seal a gap between the stationary structure and the rotating structure;
wherein the plurality of seal shoes are arranged circumferentially about and sealingly engage the rotating structure; and
wherein the seal base is mounted to the stationary structure.

19. An assembly for rotational equipment, comprising:
a plurality of seal shoes arranged about a centerline in an annular array, the plurality of seal shoes comprising a first seal shoe;
a seal base extending circumferentially around the plurality of seal shoes and the centerline; and
a spring system connecting the plurality of seal shoes to the seal base, the spring system including a first spring element and a second spring element;

the first spring element between and connected to the seal base and the first seal shoe;

the second spring element between and connected to the seal base and the first seal shoe; and the first seal shoe between the first spring element and the second spring element.

20. An assembly for rotational equipment, comprising:

a plurality of seal shoes arranged about a centerline in an annular array, the plurality of seal shoes comprising a first seal shoe and a second seal shoe;

a seal base extending circumferentially around the plurality of seal shoes and the centerline; and a spring system connecting the plurality of seal shoes to the seal base, the spring system including a first spring element, a second spring element, a third spring element and a fourth spring element;

the first spring element arranged towards a first side of the first seal shoe, and the first spring element connected to and between the first seal shoe and the seal base;

the second spring element arranged towards a second side of the first seal shoe opposite the first side of the first seal shoe, and the second spring element connected to and between the first seal shoe and the seal base;

the third spring element arranged towards a first side of the second seal shoe, and the third spring element connected to and between the second seal shoe and the seal base;

the fourth spring element arranged towards a second side of the second seal shoe opposite the first side of the second seal shoe, and the fourth spring element connected to and between the second seal shoe and the seal base;

the first seal shoe and the second seal shoe laterally separated by a first lateral distance; and the first spring element and the third spring element laterally separated by a second lateral distance that is equal to the first lateral distance.

\* \* \* \* \*